Nov. 6, 1928.
A. KLIMEK
1,690,121
BRAKE METER
Filed Dec. 3, 1926
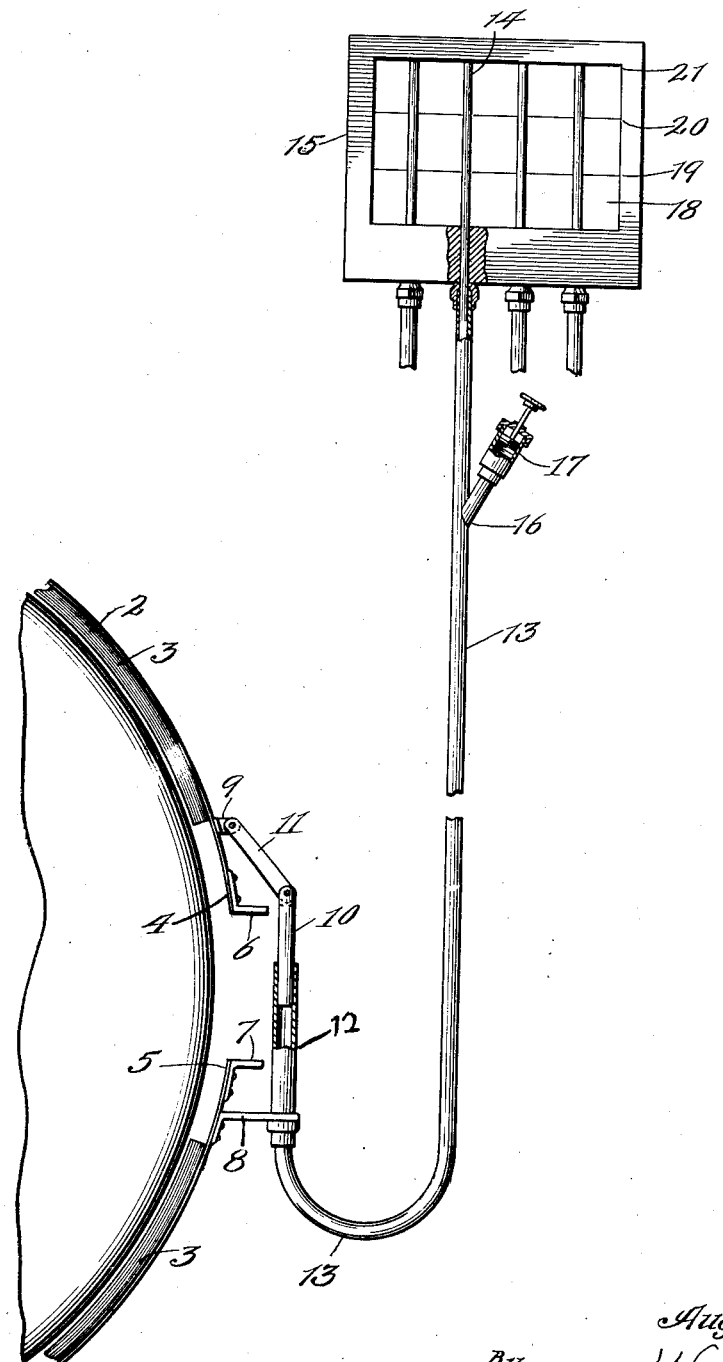
Inventor:
August Klimek
By Wallace R. Lane
Atty.

Patented Nov. 6, 1928.

1,690,121

UNITED STATES PATENT OFFICE.

AUGUST KLIMEK, OF CHICAGO, ILLINOIS.

BRAKE METER.

Application filed December 3, 1926. Serial No. 152,382.

This invention is a meter for indicating the operative position of a brake mechanism and for indicating by means of a visual indicator the condition of wear of the operating parts of a brake mechanism.

One of the objects of this invention is to provide an indicator and means for operating it to indicate the operative relation of parts of a brake mechanism.

Another object of this invention is to provide means for indicating the amount of wear which has taken place in a part of a brake mechanism which is subject to wear.

Another object of this invention is to provide means for indicating either or both of the above two conditions, that is, wear and operative relations, at a place remote from the brake mechanism whenever necessary.

Another object of this invention is to provide a brake indicator having the capabilities set forth above and which is easily adjustable, simple in construction and reliable.

Further objects, advantages and capabilities will later appear and are inherently possessed by the invention.

My invention further resides in the combination, construction and arrangement of parts illustrated in the accompanying drawings, and, while I have shown therein a preferred embodiment, I wish it understood that the same is susceptible of modification and change without departing from the spirit thereof.

While this invention is easily applicable to other types of brake mechanisms than the one shown in this drawing, I have selected a mechanism such as is commonly employed on automobiles for the purpose of illustrating the invention. The invention could as well be applied to an expanding as a contracting brake band.

Referring now to the drawings, the figure is a diagrammatic illustration of the invention with several of the parts shown in detail, partly in cross-section.

There is indicated a portion of a brake drum 1 about which is disposed a brake band 2 having attached to its inner surface a brake lining 3. This brake band is of the common type of contracting band and has two ends 4 and 5 which move as the band is contracted. Means for contracting the band may be attached to the lugs 6 and 7, however, the brake operating mechanism is not a part of this invention.

For the purpose of illustrating the invention, I have shown two members which are attached to the brake band near the ends 4 and 5, one of these elements being indicated as 8 and the other as 9. Suitably connected with the member 9 and a piston 10 is a link 11 which is adapted to transmit the motion of the end 4 of the brake band to the piston 10. A cylinder 12 receives the piston 10 and may be also movable itself or may be, as desired, disposed in a stationary position.

A tube 13 is suitably connected with the cylinder 12 and extends from the location of the brake mechanism to the point where it is desired to locate the indicator. When this device is used on an automobile, a desirable place for the indicator would be on the dash of the automobile. A tube 14, preferably transparent, is suitably connected with the tube 13 and is located in the indicator 15. In order to utilize the relative motion of the movable ends of the brake band through the means of the cylinder and piston a fluid, such as a light oil, is placed in the tube 13 and is caused to rise or fall in the tube 14 as the piston moves into or out of the cylinder 12.

The indicator shown in the drawing is illustrated as having four transparent tubes, one for each of the brakes of an automobile, although the number of tubes is not of material importance in this invention. In order to adjust the height of the fluid column or to replenish the fluid whenever either may be desirable, a regulating device is attached to the tube 13 at any suitable point 16. A plunger 17 is disposed within this regulating device and is movable inwardly or outwardly in order to adjust the height of the column. It is evident that this plunger may be removed whenever it is desired to put in more fluid or take out fluid.

When the fluid in the tube rests at the height indicated by the numeral 18, it indicates that the brakes are too loosely adjusted. When the brakes are properly adjusted and in released position the fluid should remain at the height indicated by the numeral 19. A slight variation here could take place between the level 19 and the level 20 which latter level would indicate that the brakes are applied. The amount of wear which has taken place in the lining would be indicated as the fluid was found to come to rest at higher and higher points toward the level 21. At the maximum level 21 it would appear that the lining was so badly worn that it should be replaced. By means of the adjusting devices 16 and 17 a level in the indicator may be made to correspond with the actual brake condition. Hence, it is apparent that this brake meter indicates not only the amount of wear which has taken place in the brake lining but it also indicates the relation of the brake band to the brake drum and in general indicates the adjustment of the brakes. The extreme value of this visual indicator is well understood in view of the increasing laws and police regulations regarding proper brake adjustment and in view of the natural disinclination of drivers of motor vehicles to spend any time or go to the inconvenience of examining the brake bands in their usual inconvenient and inaccessible positions. In fact, this indicator is capable of giving information which most vehicle drivers are incapable of ascertaining by an inspection of the braking mechanism, as few have the skill or accurate perception to recognize the condition of a braking mechanism from merely glancing at it.

The indicator used in conjunction with the indicator actuating means need not be of the type illustrated in this drawing as it is obviously possible to use an indicator having a rotating hand or pointer, and it is equally possible to have other types of indicators actuated by the fluid in the tube 13.

The cylinder and piston together with the tube and fluid are not the only means which may be employed for carrying out this invention, that is for indicating at a remote point the operative relation between the movable parts of a brake mechanism for indicating the amount of wear on a wearable part, as a link mechanism not containing a fluid might also be employed for operating the visual indicator.

Having thus disclosed my invention, I claim:

1. A brake meter connectable with an arcuate brake band acting on a brake drum comprising an indicating means, an actuating means therefor connected with said band and operated by the contracting and expanding of the band for indicating the average thickness of the brake band lining.

2. A brake meter comprising an indicating means, a brake drum having a cooperating brake band and lining, and actuating means in combination with said brake band and indicating means for indicating the position of the band relative to the drum.

3. A brake meter connectable with an arcuate brake band having a friction surface, a piston operated by the contraction and expansion of the band, a cylinder cooperating with the piston and connected to the band, indicating means, and means actuated by the relative movement of the piston and cylinder for operating the indicating means.

4. A brake meter connectable with an arcuate expansible brake band having a friction surface and acting on a drum, comprising an indicating means, and means for actuating said indicating means in combination with said expansible brake band for indicating various positions of the band relative to the drum.

5. A brake meter connectable with a brake band having a lining and cooperable with a brake drum, comprising indicating means, and means in combination with said brake band for actuating said indicating means.

6. A brake meter connectable with a brake band and comprising, a member connectable with one end of said brake band, a second member connectable with the other end of the brake band, indicating means, and means operable by the relative movement of said members for actuating the indicating means.

7. A brake meter connectable with an arcuate expansible band acting on a drum, comprising an indicating means, and means actuated by said band for actuating said indicating means for indicating various positions of the band relative to the drum.

8. A brake meter comprising a braking means, indicating means for indicating the position of said braking means, and means actuated by the functioning of the braking means for actuating the indicating means.

9. A brake meter connectable with an arcuate brake band having a friction surface, comprising indicating means, and means cooperable with said brake band for actuating the indicating means for indicating various radial positions of said friction surface.

In witness whereof, I hereunto subscribe my name to this specification.

AUGUST KLIMEK.